US008356072B1

(12) United States Patent
Chakraborty et al.

(10) Patent No.: US 8,356,072 B1
(45) Date of Patent: *Jan. 15, 2013

(54) SYSTEMS AND METHODS FOR SCALABLE HETEROGENEOUS AND HOMOGENEOUS UNIFIED ENTERPRISE STORAGE CLUSTERS

(75) Inventors: Subhasish Chakraborty, Sunnyvale, CA (US); Pawan Hosakote Nagesh, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/835,966

(22) Filed: Jul. 14, 2010

(51) Int. Cl.
*G06F 15/16* (2006.01)

(52) U.S. Cl. ......... 709/203; 709/219; 709/221; 709/226

(58) Field of Classification Search .................. 709/203, 709/201, 217, 219, 220, 221, 223, 224, 226; 715/700–866
See application file for complete search history.

(56) References Cited

U.S. PATENT DOCUMENTS

| | | | | |
|---|---|---|---|---|
| 6,901,446 B2 * | 5/2005 | Chellis et al. | ................. | 709/226 |
| 7,774,469 B2 * | 8/2010 | Massa et al. | ................. | 709/226 |
| 7,840,662 B1 * | 11/2010 | Natanzon | ...................... | 709/223 |
| 8,055,735 B2 * | 11/2011 | Krishnappa et al. | .......... | 709/220 |
| 2005/0038890 A1 * | 2/2005 | Masuda et al. | ................ | 709/224 |
| 2008/0243866 A1 * | 10/2008 | Pandey | ........................... | 707/10 |
| 2008/0320121 A1 * | 12/2008 | Altaf et al. | ..................... | 709/224 |

OTHER PUBLICATIONS

Co-pending U.S. Appl. No. 13/620,703 of Chakraborty, S., et al., filed Sep. 14, 2012.

* cited by examiner

*Primary Examiner* — Ruolei Zong
(74) *Attorney, Agent, or Firm* — Perkins Coie LLP

(57) ABSTRACT

The techniques introduced here include systems and methods for scalable heterogeneous or homogeneous unified enterprise cluster storage systems that include a first cluster-compliant server, a second cluster compliant server, and optionally a non-cluster-compliant server. The first cluster-compliant server can be configured for operation as a member of a cluster with the second cluster-compliant server, and further configured to service a client request from a client of the cluster storage system by utilizing the client request to send a server request to the second cluster-compliant server or the non-cluster-compliant server. The second cluster-compliant server and the non-cluster-compliant server are configured to service the server request from the first cluster-compliant server by retrieving data and sending the data to the first cluster-compliant server. The second cluster-compliant server can transition from clustering operations with the first cluster-compliant server to data serving operations with the optional non-cluster-compliant server.

32 Claims, 11 Drawing Sheets

SYSTEMS AND METHODS FOR SCALABLE HETEROGENEOUS AND HOMOGENEOUS UNIFIED ENTERPRISE STORAGE CLUSTERS

FIELD OF THE INVENTION

At least one embodiment of the present invention pertains to network storage systems, and more particularly, to a scalable cluster of heterogeneous or homogeneous storage servers.

BACKGROUND

A storage controller is a physical processing device that is used to store and retrieve data on behalf of one or more hosts. A network storage controller can be configured (e.g., by hardwiring, software, firmware, or any combination thereof) to operate as a storage server that serves one or more hosts on a network, to store and manage data in a set of mass storage devices, such as magnetic, optical, and/or solid-state storage-based disks or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers, e.g. unified storage servers, are capable of servicing both file-level requests and block-level requests, as is the case with certain enterprise storage servers made by NetApp®, Inc. of Sunnyvale, Calif.

In one implementation, a storage server makes data available to a client (host) system by presenting or exporting to clients one or more logical containers of data, such as volumes. A "volume" is an abstraction of physical storage, combining one or more physical mass storage devices (e.g., disks) or parts thereof into a single logical storage object, and which is managed as a single administrative unit, such as a single file system. A "file system" is a structured (e.g., hierarchical) set of stored logical containers of data (e.g., volumes, logical unit numbers (LUNs), directories, files). Note that a file system does not have to include storage that is based on "files" per se.

From the perspective of a client system, each volume can appear to be a single storage device, e.g. a disk drive. However, each volume can represent the storage space in a single physical storage device, a redundant array of independent disks (RAID) or a RAID group, an aggregate of some or all of the storage space in multiple physical storage devices, or any other suitable set of storage space. An "aggregate" is a logical aggregation of physical storage; i.e., a logical container for a pool of storage, combining one or more physical mass storage devices (e.g., disks) or parts thereof into a single logical storage object, which contains or provides storage for one or more other logical data sets at a higher level of abstraction (e.g., volumes).

A network storage system can have a very simple architecture. For example, an individual storage server can provide one or more clients on a network with access to data stored in a mass storage subsystem. As another example, two or more individual storage servers may be connected and configured as failover partners, to increase reliability, such as in a storage failover (SFO) or controller failover (CFO) configuration. Recently, however, with storage capacity demands increasing rapidly in almost every business sector, there has been a trend towards the use of clustered network storage systems.

In a clustered storage system, two or more storage server "nodes" are connected in a distributed architecture. The nodes are generally each implemented by one or more storage controllers. Each storage server node can be implemented with a modular hardware or software architecture. For example, a storage server node can be designed to include a network module ("N-module") to provide network connectivity and a separate data module ("D-module") to provide data storage/access functionality, where the N-module and D-module communicate with each other over a physical interconnect. Two or more such storage server nodes are typically connected to form a storage cluster.

A storage cluster may present a single system image of stored data to clients and administrators, such that the actual location of data can be made transparent to clients and administrators, i.e., clients and administrators typically do not need to be concerned about which actual node in the storage cluster stores particular data. An example of a storage controller that is designed for use in a clustered system such as this is a NetApp FAS-series filer.

Storage clusters are typically highly scaleable in comparison to non-clustered storage systems. However, despite this relative advantage over non-clustered storage systems, storage clusters still have certain problems with scaling. In particular, upward scaling in a cluster is typically achieved by adding additional storage controllers, or nodes, to the cluster. However, this is complicated by the fact that storage clusters typically require the maintenance of quorum across the storage controllers or nodes. Maintaining quorum involves ensuring that the single system image of stored data in the storage cluster is consistent across all nodes. This is computationally and network intensive, especially with a large number of nodes, because such maintenance requires replicating changes across nodes in a consistent, reliable way which typically has time complexity that linearly increases with the number of nodes. This problem hinders the ability to scale up clusters to include additional storage controllers, or nodes, which ultimately limits the performance of such clusters.

SUMMARY

Introduced below are techniques for scalable heterogeneous or homogeneous unified enterprise cluster storage systems that include a first cluster-compliant server, a second cluster-compliant server, and optionally a non-cluster-compliant server. The first and second cluster-compliant servers can operate together in a cluster to service requests from clients. Cluster-compliant servers are capable of providing a clustering service, while non-cluster-compliant servers are not. The servers operating together in a cluster maintain a quorum, which involves ensuring that a single system image of stored data in the storage cluster is consistent across all nodes, by (among other things) handling atomicity requirements (atomicity is a property of a data transaction in which the transaction is guaranteed to either completely occur or to have no effect). Additional servers outside the cluster perform back-end data service (access). One or both of the cluster-compliant servers can transition away from cluster operation to take up data service operation, alongside the optional non-cluster-compliant server. During such a transition, data to be accessed can be migrated to the transitioning second cluster-compliant server. While reversing the transition, data can be migrated away from the transitioning second cluster-compliant server. By transitioning servers into and away from cluster operation, and by not requiring back-end data service servers to maintain quorum, the amount of servers maintaining quorum can be managed to improve the ability of the cluster to scale up.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The above and further advantages of the technique introduced here may be better understood by referring to the following description in conjunction with the accompanying drawings in which like reference numerals indicate identical or functionally similar elements.

DETAILED DESCRIPTION

References in this specification to "an embodiment", "one embodiment", or the like, mean that the particular feature, structure or characteristic being described can be included in at least one embodiment of the present invention. Occurrences of such phrases in this specification do not necessarily all refer to the same embodiment.

System Environment

Figure 1:
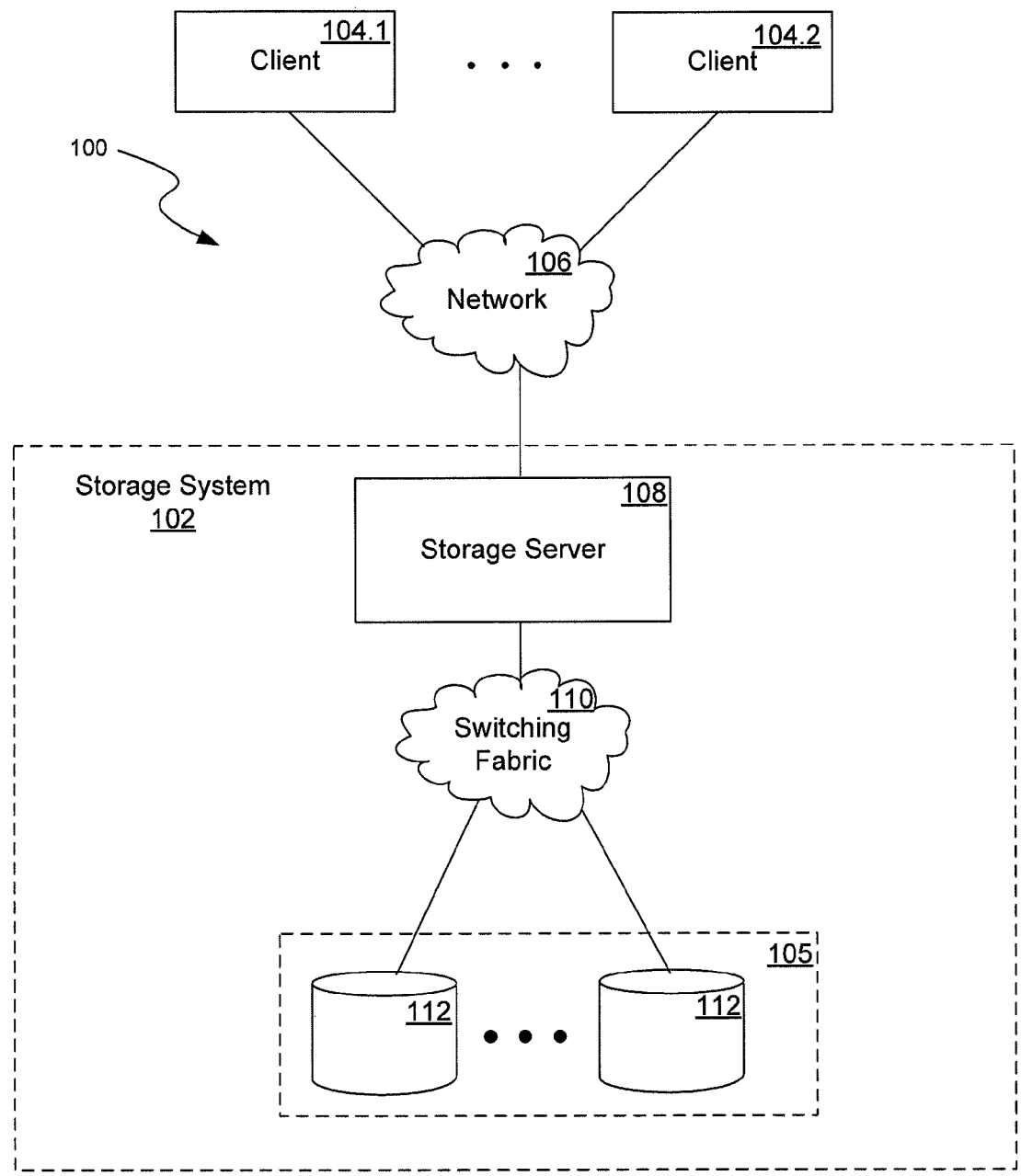
FIG. 1 illustrates a network data storage environment including clients and a storage system.

FIG. 1 depicts network data storage environment 100, which includes a plurality of clients 104, storage system 102, and network 106. Network 106 connects clients 104 and storage system 102. As shown in FIG. 1, storage system 102 includes storage server 108, switching fabric 110, and disks 112 in mass storage subsystem 105. Some or all of disks 212 can be hard drive disks, arrays of disks (e.g., RAID), flash memory, solid-state drives (SSDs), tape storage, or other forms of devices for persistent data storage.

Storage server 108 can be, for example, a storage server product available from NetApp, Inc. Clients 104 are connected to storage server 108 via network 106, which can be, for example, a packet-switched network, a local area network (LAN), or a wide area network (WAN). Further, storage server 108 is connected to disks 112 via switching fabric 110, which can be a fiber distributed data interface (FDDI) network, for example. It is noted that, within the network data storage environment, other suitable combinations of storage servers, mass storage devices, and any other suitable network technologies may be employed. Although FIG. 1 contemplates a fully connected switching fabric 110 by which all storage servers can see all storage devices, it is understood that such a topology is not required. In some embodiments, the storage devices can be connected to the storage servers such that not all storage servers can see all storage devices.

Storage server 108 can make some or all of the storage space on disks 112 available to the clients 104 in a conventional manner. Each of disks 112 can be implemented as, for example, an individual disk, multiple disks (e.g., a RAID group) or any other suitable mass storage device. Storage server 108 can communicate with the clients 104 according to protocols such as the Network File System (NFS) protocol or the Common Internet File System (CIFS) protocol, to make data stored on disks 112 available to users or application programs. Storage server 108 can present or export data stored on disks 112 as volumes to each of clients 104.

Figure 2:
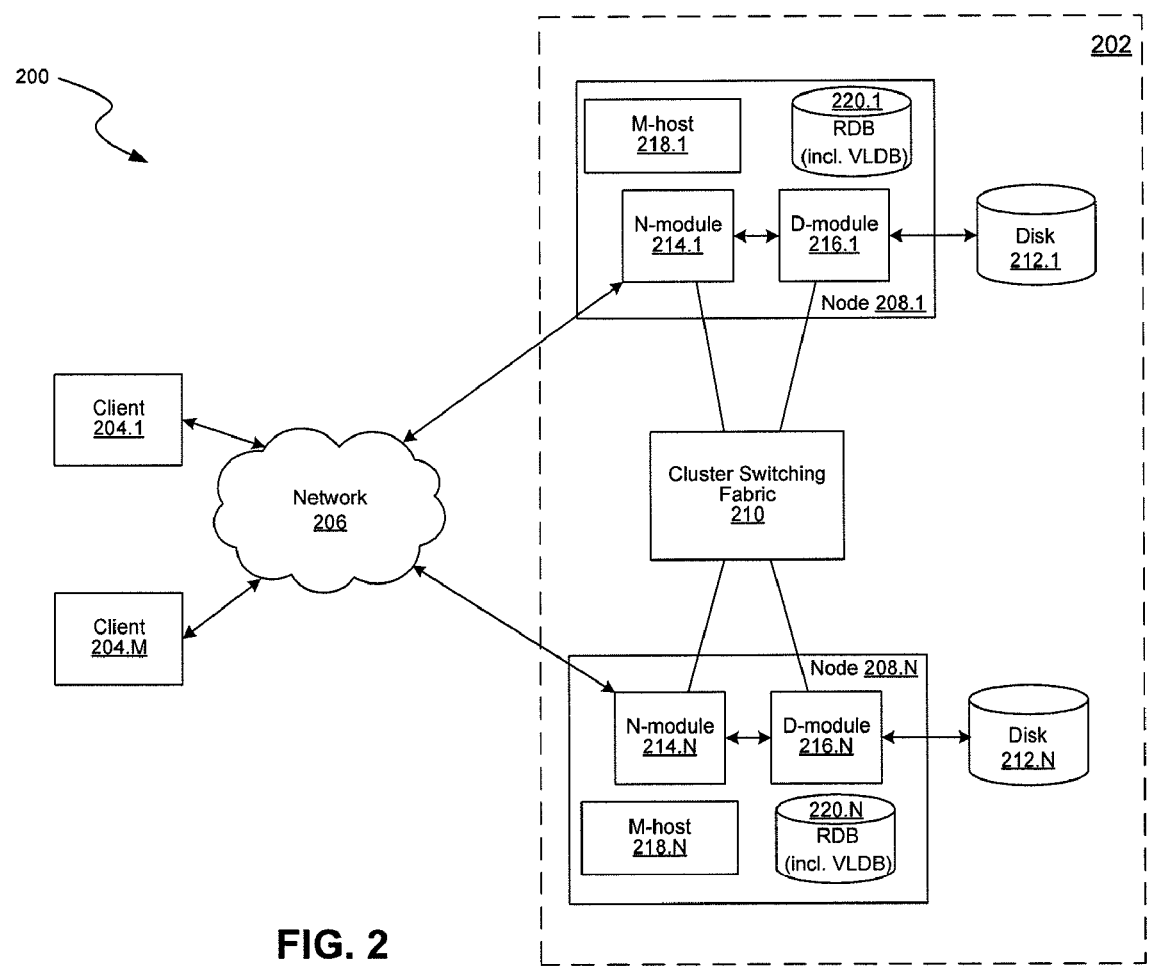
FIG. 2 illustrates a network data storage environment including clients and a clustered storage system.

FIG. 2 depicts network data storage environment 200, which includes a plurality of clients 204, clustered storage system 202, and network 206 connecting clients 204 and clustered storage system 202. As shown in FIG. 2, clustered storage system 202 includes a plurality of server nodes 208, cluster switching fabric 210, and a plurality of disks 212. Disks 212 can be mass storage devices such as hard drive disks, arrays of disks (e.g., RAID), flash memory, SSDs, tape storage, etc. Note that more than one disk 212 can be associated with each node 208.

Each of nodes 208 is configured to include N-module 214, D-module 216, and M-host 218. Each module can be implemented by using a separate software module or hardware module. Each of nodes 208 also includes an instance of a replicated database (RDB) 220. Specifically, for example, node 208.1 includes N-module 214.1, D-module 216.1, and M-host 218.1; node 208.N includes N-module 214.N, D-module 216.N, and M-host 218.N. N-modules 214 include functionality that enables nodes 208 to connect to one or more of clients 204 over network 206, while D-modules 216 provide access to the data stored on disks 212. M-hosts 218 provide management functions for the clustered storage system 202. Accordingly, each of server nodes 208 in the clustered storage server arrangement provides the functionality of a storage server.

RDB 220 is a database that is replicated throughout the cluster, i.e., each node 208 includes an instance of RDB 220. The various instances of RDB 220 are updated from time to time to bring them into synchronization with each other. RDB 220 provides cluster-wide storage of various information used by nodes 208, including a volume location database (VLDB) within RDB 220. The VLDB indicates the location within the cluster of each volume in the cluster (i.e., the owning D-module 216 for each volume) and is used by N-modules 214 to identify the appropriate D-module 216 for any volume to which access is requested by, for example, one of clients 204.

Nodes 208 are interconnected by cluster switching fabric 210, which can be embodied as a Gigabit Ethernet switch, for example. Note that while there are shown an equal number of N-modules and D-modules in FIG. 2, there may be differing numbers of N-modules and/or D-modules in accordance with various embodiments of the technique described here. As such, there need not be a one-to-one correspondence between N-modules and D-modules; subsequent figures depict embodiments with varying correspondences.

Each of nodes 208 in clustered storage system 202 is running the services described above, and is generally responsible for D-Blade (WAFL, RAID etc.), M-Host (The Management gateway daemon containing replication services and persistence services such as RDB, CDB and volume location records such as VLDB) and N-Blade (Protocol converter from outside protocols such as NFS, CIFS to internal protocol) as major components. There is a performance penalty in terms of memory management and process management that each of nodes 208 has to pay in order to run all the above components. In particular, operations in RDB 220 are costly, because each operation has to be atomic and distributed amongst nodes 208. All nodes 208 have to be in quorum, even if only one node 208.1 in the cluster is making use of the M-host environment to interact with one of clients 204, and the other nodes 208 are essentially only serving D-module 216 data. Maintaining quorum involves ensuring that the single system image of stored data in the storage cluster is consistent across all nodes. As such, in order to maintain atomicity, RDB 220 operations will execute and slow down performance of all nodes 208. For at least this reason, scaling up clustered storage system 202 to a large number of nodes is difficult.

Figure 3:
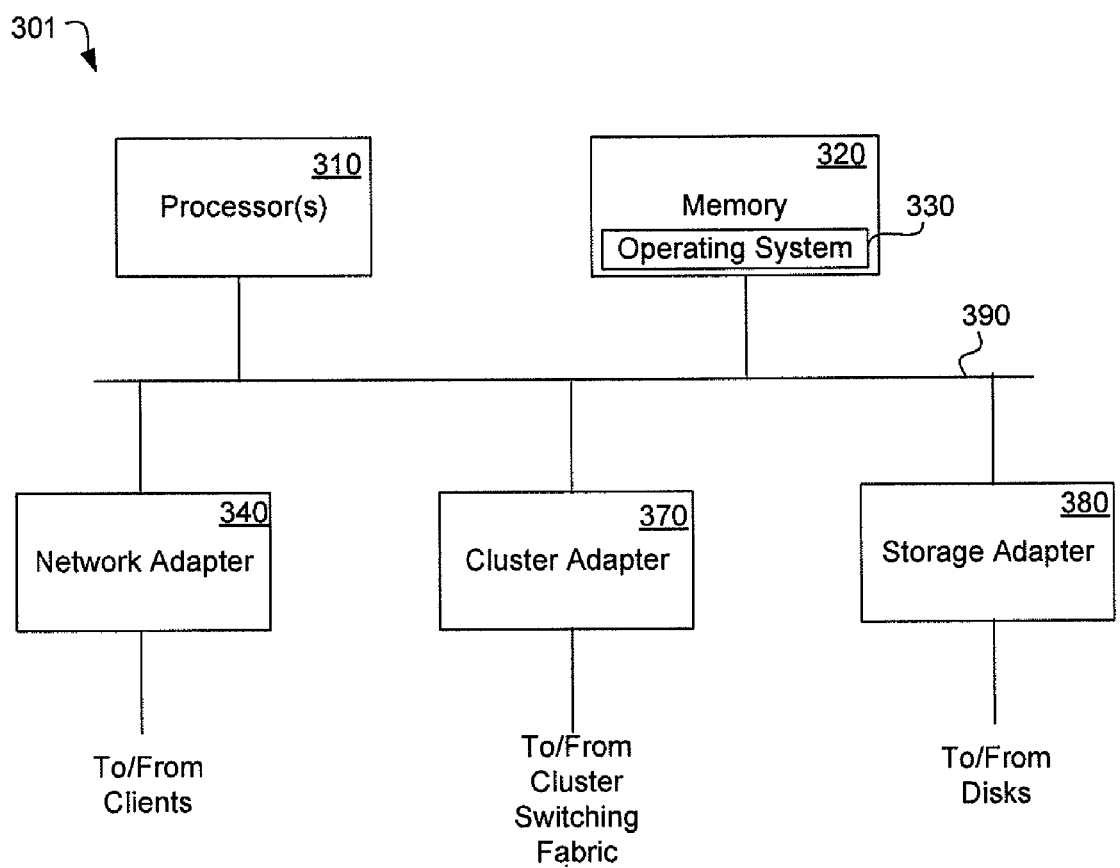
FIG. 3 is a high-level block diagram showing an example of the hardware architecture of a storage controller that can implement one or more storage server nodes.

FIG. 3 illustrates storage controller 301 that can implement one of storage server nodes 208 depicted in FIG. 2. In an exemplary embodiment, storage controller 301 includes a processor subsystem that includes one or more processors 310. Storage controller 301 further includes memory 320, network adapter 340, cluster adapter 370, and storage adapter 380, all interconnected by interconnect 390. Cluster adapter 370 includes one or more ports for coupling storage controller 301 to, for example, other nodes 208 via cluster switching fabric 210 in clustered storage system 202. In the illustrated embodiment, Ethernet is used as the clustering protocol and interconnect media, although other types of protocols and interconnects may be utilized within the cluster architecture described herein.

Storage controller 301 can be embodied as a single- or multi-processor storage system executing storage operating system 330 that in one embodiment implements a high-level module, such as a storage manager, to logically organize information as a hierarchical structure of named directories, files, or blocks on the disks. Illustratively, one processor 310 can execute the functions of N-module 214 in storage controller 301 while another processor 310 executes the functions of D-module 216.

Memory 320 illustratively includes storage locations that are addressable by processors 310 and adapters 340, 370, 380 for storing software program code and data structures associated with the present techniques. Processor 310 and adapters 340, 370, 380 may, in turn, include processing elements and/or logic circuitry configured to execute the software code and manipulate the data structures. Storage operating system 330, portions of which are typically resident in memory 320 and executed by processors 310, functionally organizes storage controller 301 by, among other things, configuring processor 310 to invoke storage operations in support of the storage service provided by storage controller 301. It will be apparent to those skilled in the art that other processing and memory implementations, including various computer readable storage media, may be used for storing and executing program instructions pertaining to the technique introduced here.

Network adapter 340 includes one or more ports to couple storage controller 301 to one or more clients 204 over network 206, a point-to-point link, wide area networks, virtual private networks implemented over a public network (e.g., the Internet), or a shared local area network. Network adapter 340 thus can include the mechanical, electrical, and signaling circuitry needed to connect storage controller 301 to network 206. Illustratively, network 206 can be embodied as an Ethernet network or a Fibre Channel (FC) network. Each client 204 can communicate with a node 208 over the network 206 by exchanging discrete frames or packets of data according to pre-defined protocols, such as TCP/IP.

Storage adapter 380 cooperates with storage operating system 330 to access information requested by clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. Storage adapter 380 includes one or more ports having input/output (I/O) interface circuitry that couples to disks 212 over an I/O interconnect arrangement, such as a high-performance Fibre Channel (FC) link topology.

Storage of information on disks 212 can be implemented as one or more storage volumes that include a collection of physical storage disks cooperating to define an overall logical arrangement of space on the volume(s). Disks 212 can be organized as a RAID group. One or more RAID groups together can form an aggregate. An aggregate can contain one or more volumes/file systems.

Figure 4:
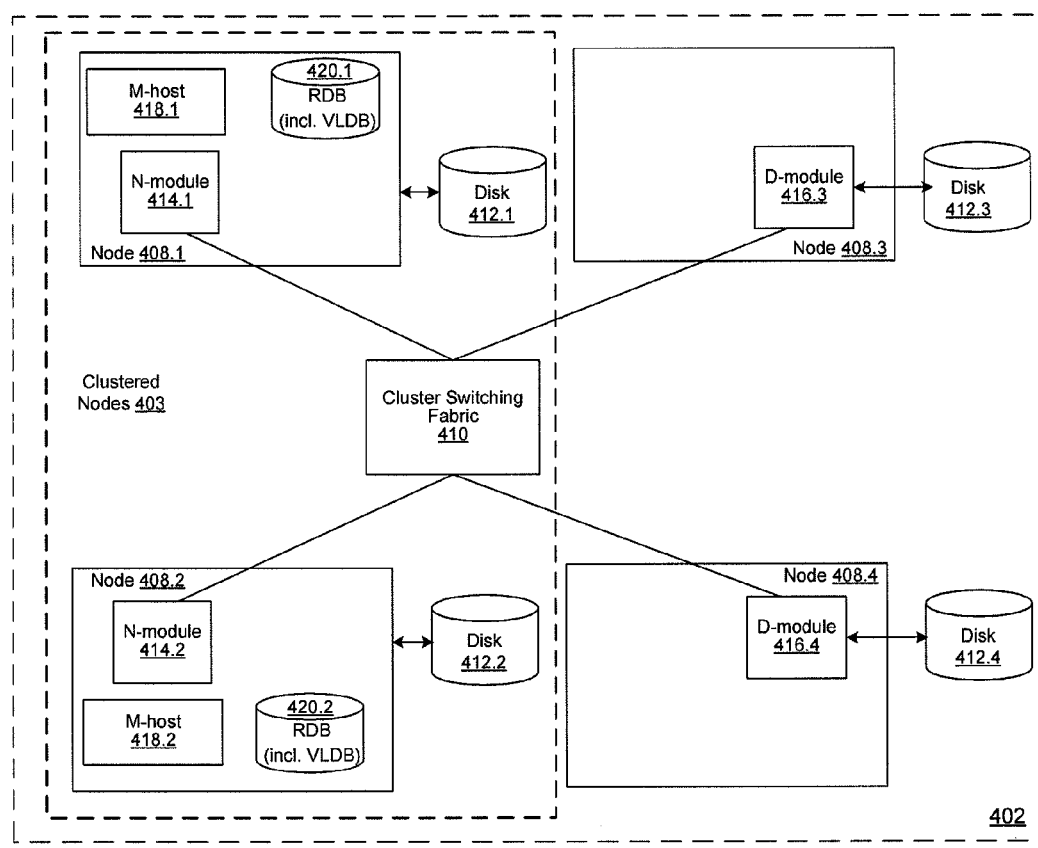
FIGS. 4, 5A, and 5B each illustrate a clustered storage system including clustered nodes according to the techniques introduced here.

FIG. 4 depicts clustered storage system 402, which includes some structures corresponding to those in clustered storage system 202 depicted in FIG. 2. In one embodiment clustered storage system 402 is an enterprise storage system. Clustered storage system 402 can be included in a network data storage environment, corresponding to network data storage environment 200, which includes a plurality of clients and a network connecting the clients to clustered storage system 402. As shown in FIG. 4, clustered storage system 402 includes a plurality of server nodes 408, cluster switching fabric 410, and a plurality of disks 412. Disks 412 can be mass storage devices corresponding to disks 212 in FIG. 2 (e.g., some or all of disks 412 can be hard drive disks, arrays of disks (e.g., RAID), flash memory, solid-state drives (SSDs), tape storage, or other forms of devices for persistent data storage). Those skilled in the art will understand that the techniques introduced here can be implemented on any storage media.

Within clustered storage system 402, nodes 408.1 and 408.2 are within clustered nodes 403 (depicted with a dashed line) while nodes 408.3 and 408.4 are not within clustered nodes 403. As such, nodes 408.1 and 408.2 participate in providing cluster services, and maintain quorum amongst each other (e.g., handle atomicity and replication requirements for maintaining a single system image of stored data), while nodes 408.3 and 408.4 provide data services. Further, nodes 408.1 and 408.2 can be referred to as cluster-compliant nodes, or cluster-compliant servers, while nodes 408.3 and 408.4 can be referred to as non-cluster-compliant nodes, or non-cluster-compliant servers. This division of labor between nodes is described in further detail below.

Nodes 408.1 and 408.2 within clustered nodes 403 are configured to include N-module 414, M-host 418, and RDB 420. As discussed above with respect to nodes 208 in FIG. 2, each module can be implemented by using a separate software module or hardware module. Further, N-modules 414 include functionality that enables nodes 408.1 and 408.2 to connect to clients, while M-hosts 418 provide management functions for the clustered storage system 402. RDB 420 is a database that is replicated throughout cluster nodes 403 (i.e., nodes 408.1 and 408.2 include an instance of RDB 420) but is not replicated on the non-clustered nodes 408.3 and 408.4. The various instances of RDB 420 are updated from time to time to bring them into synchronization with each other. RDB 420 provides storage across cluster nodes 403 of various information used by nodes 408, including a volume location database (VLDB) within RDB 420. The VLDB indicates the location, typically outside of clustered nodes 403 and within nodes 408.3 and 408.4, of each volume in clustered storage system 402 (i.e., the owning D-module 416 for each volume), and is used by N-modules 414 to identify the appropriate D-module 416 for any volume to which access is requested by, for example, one of the clients.

Notably, clustered storage system 402 scales up to a large number of nodes in a manner superior to clustered storage system 202. This is the case at least in part because in clustered storage system 202, every node participates in cluster management (e.g., maintains quorum to ensure that the single system image of stored data in the storage cluster is consistent across all nodes). Such participation in cluster management necessarily implicates high time complexity (e.g., linear time complexity, or O(n) complexity) for certain cluster operations across clustered storage system 202. For example, the participation time complexity can increase linearly with the amount of nodes. In contrast, in clustered storage system 402, only the nodes within clustered nodes 403 participate in cluster management. As such, the addition of additional nodes to clustered storage system 402 outside of clustered nodes 403 (e.g., the addition of a fifth node similar to node 408.3 or 408.4) does not significantly increase cluster management requirements. Such addition in clustered storage system 402, and other cluster management tasks in clustered storage system 402, may require only low time complexity (e.g., constant time complexity, or O(1) complexity). For example, the addition (and other task) time complexity can remain substantially constant with the amount of nodes. Thus clustered storage system 402 has time complexity advantages in comparison to clustered storage system 202.

In clustered storage system 402, performance in both memory management and process management is gained, because nodes are specialized and thus not running all services. Nodes 408.3 and 408.4 run only D-module 416, and are not required to maintain information regarding the cluster. Nodes 408.3 and 408.4 may require less power to operate than nodes 408.1 and 408.2. In one embodiment, nodes 408.3 and 408.4 are not aware of the presence of the cluster, and serve only to handle back-end storage processes such as file-system management, RAID, etc. In contrast, the nodes within clustered nodes 403 receive incoming traffic (e.g., Internet Protocol traffic) containing requests from clients (e.g., NFS or CIFS). The nodes within clustered nodes 403 implement a unified cluster, in that the cluster is configurable to handle a wide variety of client request formats (e.g., NFS, CIFS, etc.) in a unified manner.

Nodes 408.1 and 408.2 store metadata information used for maintaining the cluster. The metadata information is stored using persistent and replicated storage in RDB 420. Nodes 408.1 and 408.2 can also run a management gateway daemon that runs a service (e.g., inetd) to handle incoming Secure Shell, Remote Shell, and telnet connections from clients. Nodes 408.1 and 408.2 also expose Logical Interfaces ("LIFs") which receive NFS/CIFS requests from clients (e.g., client requests). Upon receipt of an NFS/CIFS request, node 408.1 or 408.2 uses its local N-module 414 to convert the request to an internal request (e.g., a server request) for use within clustered storage system 402. The internal request is used to look up the MSID (for tracking the client) and DSID (for tracking the volume) from the VLDB ("Volume Location Database") in RDB 420. Once the MSID and DSID are identified for an internal request, D-module API calls (e.g., ZAPI calls, or Zephyr API calls) are sent to the appropriate node 408 outside of clustered nodes 403, after which the D-module 416 in that node processes the calls and returns the volume data to the clients against the client NFS/CIFS handle.

Figure 5A:
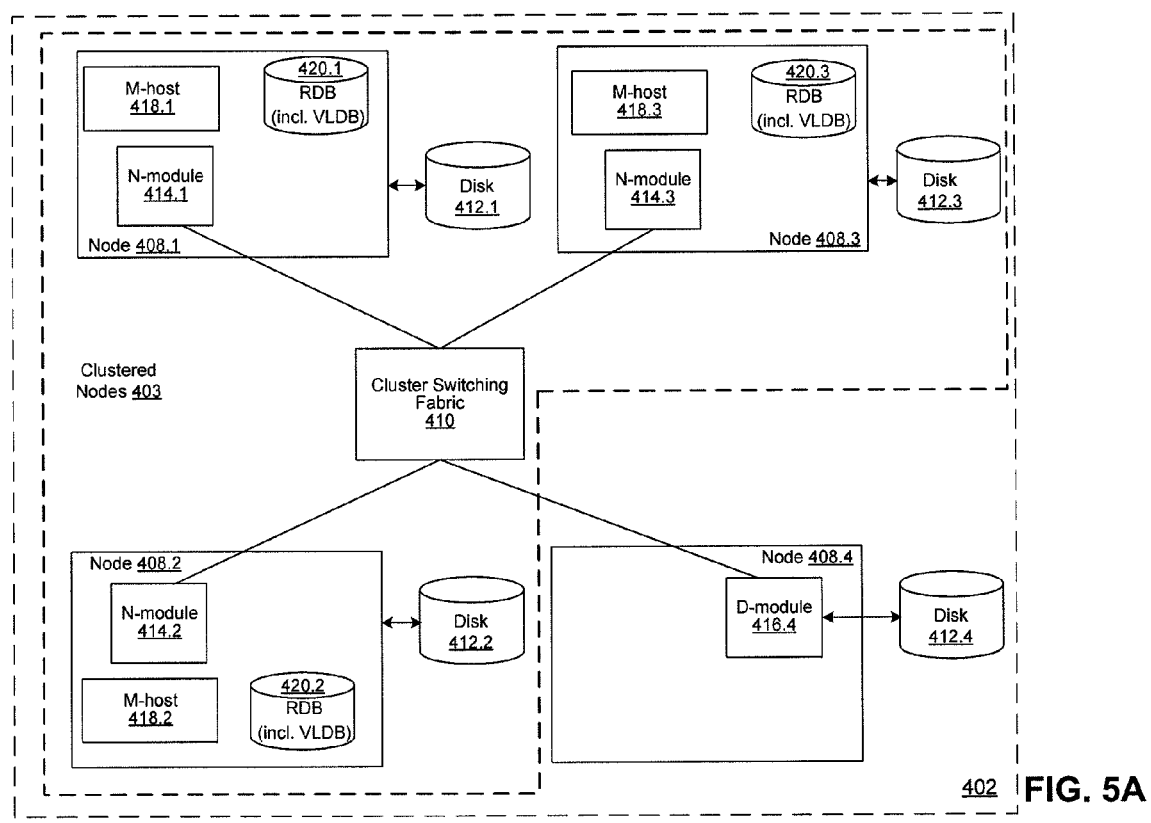

As depicted in FIG. 5A, the role of each node 408 can change. In particular, FIG. 5A depicts clustered storage system 402 after node 408.3 has transitioned from a primarily data-serving node outside of clustered nodes 403, to a cluster node inside clustered nodes 403 (the boundary of clustered nodes 403 has been expanded in FIG. 5A to reflect the change). The transitioning includes beginning the execution of M-host 418.3, N-module 414.3, RDB 420.3, and any other cluster management software or process needed, and stopping the execution of D-module 416.3 (all such software or hardware modules may be resident on or included in node 408.3, whether or not executing or operating at any given time).

The number of nodes within clustered nodes 403 can be dynamic and so modified at any point in time that it is optimized to serve the incoming requests from clients. In one embodiment, one or more of the nodes 408 within clustered nodes 403 periodically determines whether clustered nodes 403 should grow or be reduced in size based on the required cluster performance. In particular, in one embodiment, cluster services software or processes within one or more of M-hosts 418 makes the determination. For example, in one embodiment M-host 418.1 can gather information about the incoming client requests to node 408.1 to make a decision to grow or reduce clustered nodes 403. In another embodiment, M-host 418.1 can gather information about the incoming client requests to node 408.1 and node 408.2 to make a decision to grow or reduce clustered nodes 403. In a third embodiment, M-host 418.1 and M-host 418.2 can gather and share information about the incoming client requests to node 408.1 and node 408.2 to make a decision to grow or reduce clustered nodes 403.

The determination can be based on, for example, whether a node is servicing client requests exceeding a transition threshold (e.g., in terms of requests per unit time, or data served per unit time, etc.), or is performing at or above a particular workload or load factor (e.g., as determined by the incoming client data traffic and the total amount of storage being handled by the node). The determination can also be based on the amount of processor usage, the amount of memory usage, I/O activity, or disk activity, for example. Based on the determination, the number of nodes within clustered nodes 403 can vary. For example, FIG. 4 depicts two nodes within clustered nodes 403, while FIG. 5A depicts three nodes within clustered nodes 403. In an embodiment having N total nodes, the number of nodes within clustered nodes 403 can vary from one (in which case the sole node within clustered nodes 403 is essentially handling all requests from clients by itself) to N−1 (leaving only one node of N outside of clustered nodes 403 to serve data by running a D-module 416).

As further depicted in FIG. 5A, after changing roles and joining clustered nodes 403, node 408.3 is still attached to disk 412.3. It should be thus understood that the transition can be, in one embodiment, software or process based and optionally user initiated such that no rewiring or hardware reconfiguration is required to change roles. However, during the transition, volumes on node 408.3 can be migrated to node 408.4 so that node 408.3 no longer has a responsibility to serve them, and node 408.4 can take over the responsibility for serving them. Migrating includes transferring data from one location to another location. It should also be understood that node 408.3 can transition back into a data-serving role. For example, if the amount of incoming NFS and CIFS connections from clients decreases, node 408.3 can stop executing M-host 418.3, N-module 414.3, RDB 420.3, and any other cluster management software, and can begin again executing only D-module 416.3 (as such, node 408.3 will return to its state as depicted in FIG. 4). In this eventuality, volumes can be migrated from another data-serving node (e.g., node 408.4) to node 408.3 so that node 408.3 has data to serve.

Figure 5B:
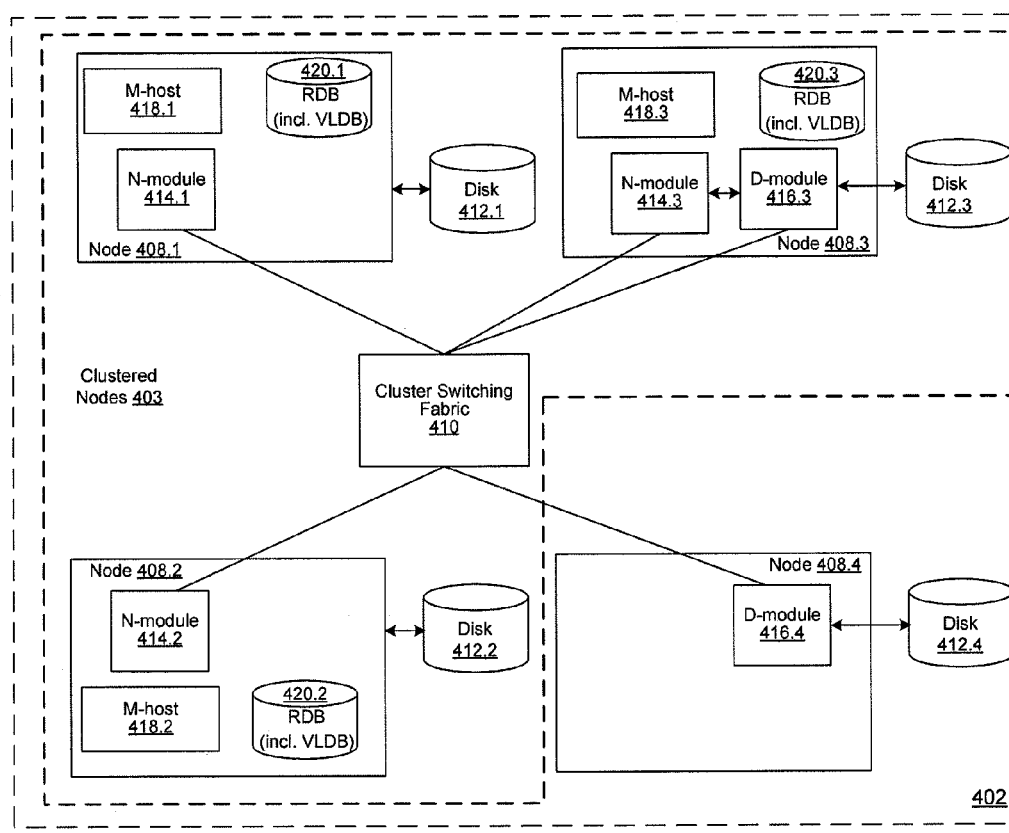

As depicted in FIG. 5B, in one embodiment each node 408 can have a shared role. In particular, FIG. 5B depicts clustered storage system 402 after node 408.3 has transitioned from a primarily data-serving node outside of clustered nodes 403, to a cluster node, inside clustered nodes 403, that is configured in a shared role to also continue serving data. The transitioning includes beginning the execution of M-host 418.3, N-module 414.3, RDB 420.3, and any other cluster management software. Beginning the execution of RDB 420.3 includes, for example, receiving a synced RDB copy and LIFs from another node. A synced RDB copy includes a copy of RDB that is synchronized with, or consistent with, a single system image of stored data. However, in contrast with the transition discussed above in relation to FIG. 5A, the transitioning does not include stopping the execution of D-module 416.3. Instead, D-module 416.3 can continue execution on node 408.3 along with M-host 418.3, N-module 414.3, RDB 420.3, and any other cluster management software.

After changing to a shared role and joining clustered nodes 403, node 408.3 is still attached to disk 412.3. It should be thus understood that the transition can be, in one embodiment, software or process based and optionally user initiated such that no rewiring or hardware reconfiguration is required to change roles. During the transition, some volumes on node 408.3 can be migrated to node 408.4 so that node 408.3, in a shared role, only has a responsibility for serving a portion of the volumes it served prior to the transition. It should also be understood that node 408.3 can transition from a shared role back into a data-serving role. For example, if the amount of incoming NFS and CIFS connections from clients decreases, node 408.3 can stop executing M-host 418.3, N-module 414.3, RDB 420.3, and any other cluster management software, and can begin again executing only D-module 416.3.

Figure 6A:
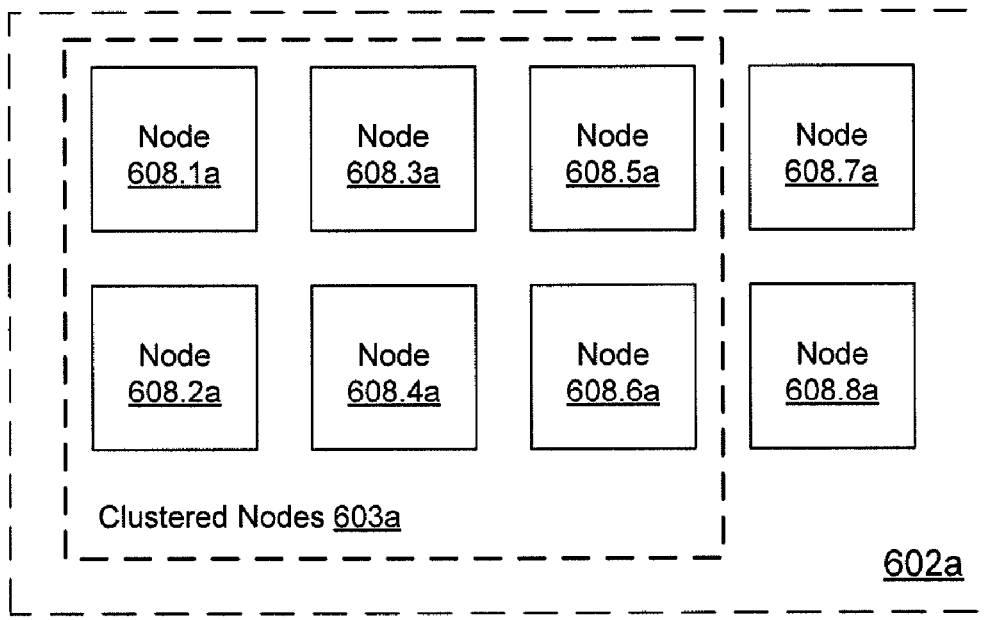
FIGS. 6A and 6C illustrate a clustered storage system including clustered homogeneous nodes.
Figure 6B:
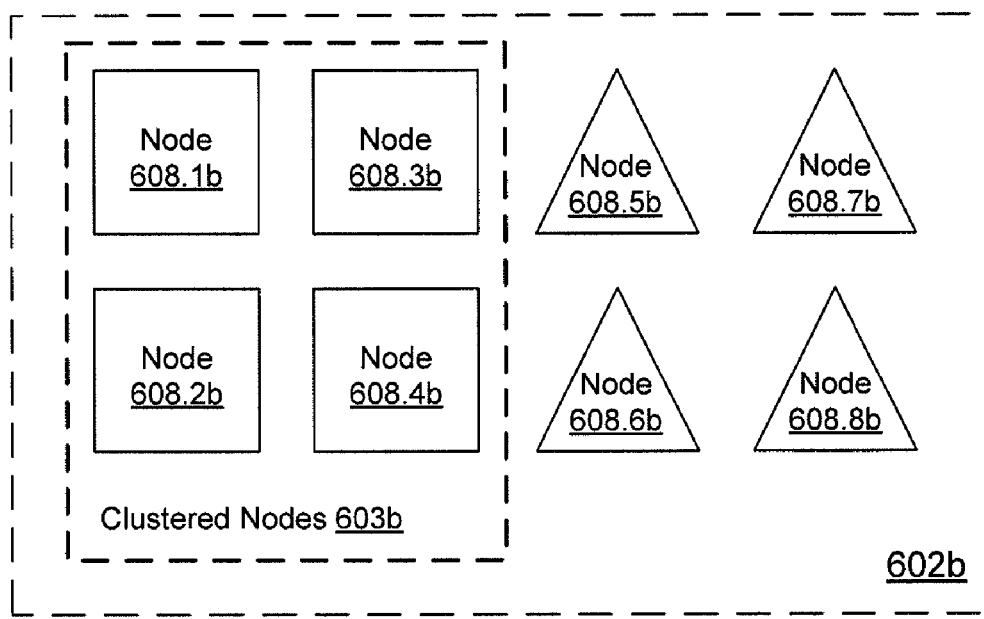
FIGS. 6B and 6D illustrate a clustered storage system including clustered heterogeneous nodes.
Figure 6C:
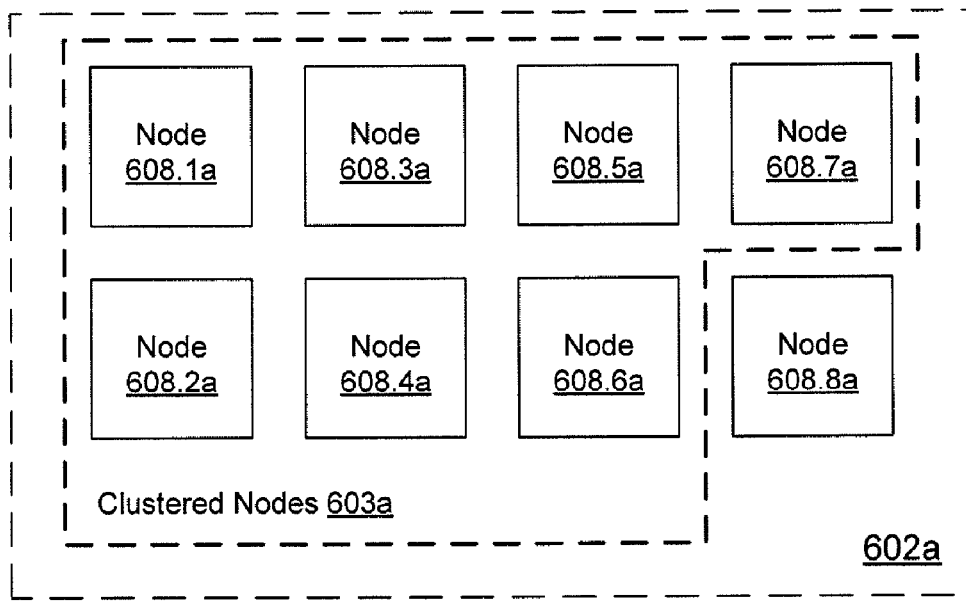
Figure 6D:
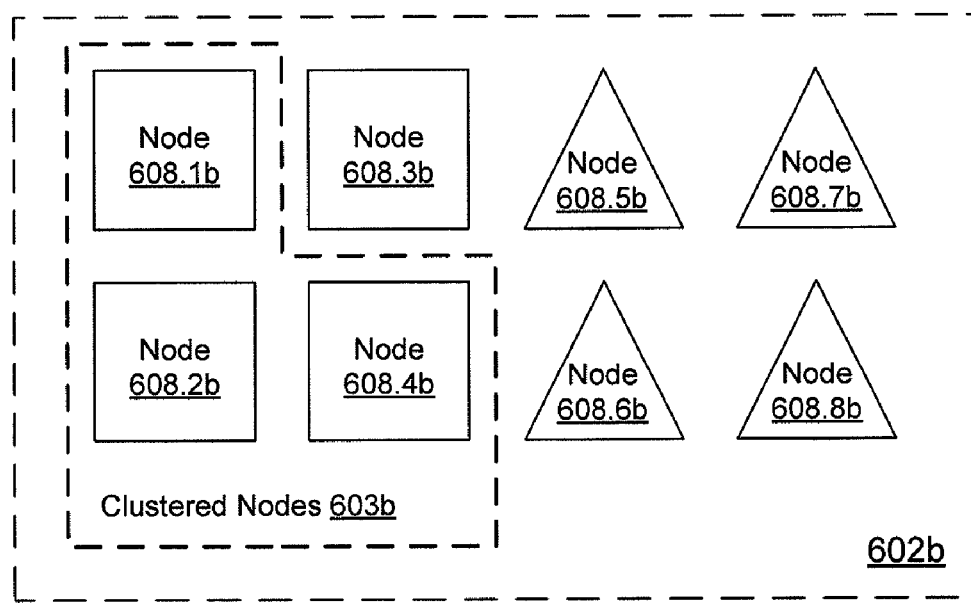

FIGS. 6A, 6B, 6C, and 6D depict clustered storage system 602a and clustered storage system 602b. FIGS. 6A and 6C illustrate transitioning a node in a homogeneous storage cluster system, while FIGS. 6B and 6D illustrate transitioning a node in a heterogeneous storage cluster system. Clustered storage system 602a includes nodes 608.1a through 608.8a (although eight nodes are depicted, other systems according to the present technique can include tens, hundreds, or thousands of nodes, for example). Each of nodes 608.1a through 608.8a substantially corresponds to node 408.1 and disk 412.1, for example (the disks attached to each of nodes 608.1a through 608.8a are omitted from FIGS. 6A and 6B for clarity). Nodes 608.1a through 608.8a are connected via a cluster switching fabric (e.g., corresponding to cluster switching fabric 410) which is omitted from FIGS. 6A and 6B for clarity. Nodes 608.1a through 608.6a are included in clustered nodes 603a, while nodes 608.7a and 608.8a are not. Clustered nodes 603a corresponds to clustered nodes 403 in FIG. 4, and as such nodes 608.1a through 608.6a are configured to provide cluster services while nodes 608.7a and 608.8a are configured to provide data services, as has been explained above. Nodes 608.1a through 608.8a can be referred to as cluster-compliant nodes, or as cluster-compliant servers, and are essentially homogeneous with respect to one another (i.e., substantially identical). In one embodiment, nodes 608.1a through 608.8a are NetApp Ontap 8G filers. Cluster-compliance will be described in greater detail below.

Clustered storage system 602b, depicted in FIG. 6B, includes nodes 608.1b through 608.8b (although eight nodes are depicted, other systems according to the present technique can include tens, hundreds, or thousands of nodes, for example). Each of nodes 608.1b through 608.4b, depicted as rectangles in the manner of FIG. 6A, substantially corresponds to node 408.1 and disk 412.1, for example, and all are connected via a cluster switching fabric. Each of nodes 608.5b through 608.8b, depicted as triangles, do not correspond to node 408.1 and disk 412.1. However, nodes 608.5b through 608.8b are connected via the same cluster switching fabric as nodes 608.1b through 608.4b. Nodes 608.1b through 608.4b are included in clustered nodes 603b, while nodes 608.5b through 608.8b are not. As such, nodes 608.1b through 608.4b are configured to provide cluster services while nodes 608.5b through 608.8b are configured to provide data services. Further, nodes 608.1b through 608.4b can be referred to as cluster-compliant nodes, or cluster-compliant servers, while nodes 608.5b through 608.8b can be referred to as non-cluster-compliant nodes, or non-cluster-compliant servers. In one embodiment, nodes 608.1b through 608.4b can be NetApp Ontap 8G filers, while nodes 608.5b through 608.8b can be NetApp Ontap 7G filers. Nodes 608.1b through 608.8b are therefore heterogeneous. Non-cluster compliance, and cluster-compliance, will be described in greater detail below.

Nodes 608.5b through 608.8b are not the same as (i.e., are heterogeneous with respect to) nodes 608.1b through 608.4b. In one embodiment, this heterogeneity occurs because the latter four nodes are instances of a different hardware version (e.g., an earlier hardware version or a later hardware version) than the former four nodes. In another embodiment, this heterogeneity occurs because the latter four nodes include the same or similar hardware, but include a firmware upgrade or downgrade with respect to the former four nodes. These two examples of heterogeneity are not meant to be exhaustive, and it should be understood that the techniques disclosed here embrace many additional forms of heterogeneity.

Because they are different from nodes 608.1b through 608.4b, nodes 608.5b through 608.8b are not capable of joining clustered nodes 603b, i.e., are non-cluster-compliant. In one embodiment, this lack of capability occurs because nodes 608.5b through 608.8b can be, but have not been, configured to be able to operate as clustered nodes. For example, nodes 608.5b through 608.8b might be firmware upgradeable to acquire such capability. In another embodiment, this lack of capability occurs because nodes 608.5b through 608.8b cannot be configured to operate as clustered nodes. For example, nodes 608.5b through 608.8b might be instances of an older hardware version that cannot be made to have the capability (or which is commercially infeasible or impractical to modify to add the capability). Both embodiments thus described are instances of non-cluster-compliant nodes.

The heterogeneity present among the nodes of clustered storage system 602b, but not present among the nodes of clustered storage system 602a, has implications regarding the expansion and contraction of clustered nodes 603a and 603b, respectively. In particular, in clustered storage system 602a, clustered nodes 603a can grow to include all of nodes 608.1a through 608.8a, because each such node is capable of joining clustered nodes 603a. Of course, in one embodiment one node (e.g., node 608.8a) can be left out of clustered nodes 603a to operate in a data serving role, rather than in a clustering role. Such an expansion is depicted in FIG. 6C.

However, in clustered storage system 602b, clustered nodes 603b cannot grow to include all of nodes 608.1b through 608.8b, because as discussed above nodes 608.5b through 608.8b are not capable of providing a clustering service (i.e., are non-cluster-compliant). Notably, clustered nodes 603b can still be reduced in size, as depicted in FIG. 6D. In FIG. 6D, clustered nodes 603b includes nodes 608.1b, 608.2b, and 608.4b, which provide clustering services. Meanwhile, node 608.3b and nodes 608.5b through 608.8b operate in a data serving role. Notably, although heterogeneous, the group including node 608.3b and nodes 608.5b through 608.8b can still operate in the data serving role. Any of nodes 608.1b through 608.4b can fulfill a data serving role in a manner similar to any of nodes 608.5b through 608.8b. As discussed above, however, nodes 608.5b through 608.8b lack a reciprocal clustering capability.

Figure 7:
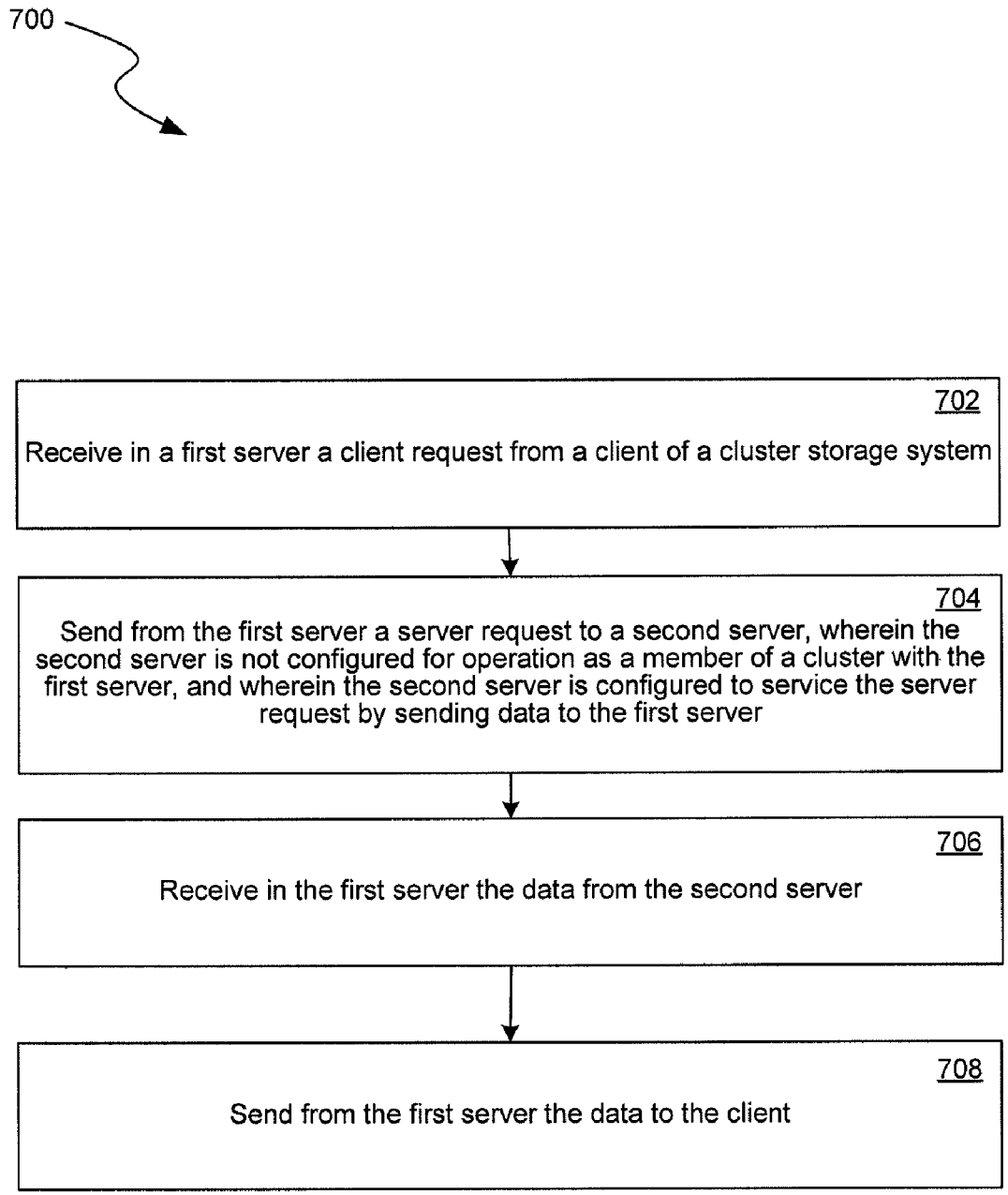
FIG. 7 depicts a flowchart illustrating a process for handling client requests for data in a clustered storage system.

FIG. 7 shows a flowchart of process 700 for handling requests according to the techniques introduced here. Process 700 includes, in step 702, receiving in a first server a client request from a client of a cluster storage system. The first server can be, for example, node 608.1a depicted in FIG. 6A, or node 608.1b depicted in FIG. 6B, and the client can be a client of clustered storage system 602a (e.g., client 204.1 in FIG. 2). The client request is a request by the client for data stored in clustered storage system 602a. The client will typically not be aware of where in clustered storage system 602a the data is located.

Process 700 continues, in step 704, with sending from the first server a server request to a second server, wherein the second server is not configured for operation as a member of a cluster with the first server, and wherein the second server is configured to service the server request by sending data to the first server. The first server sends the server request to the second server because, in one embodiment, the data requested by the client is stored on the second server, rather than the first server. The second server can be, for example, node 608.8a in FIG. 6A, or node 608.8b depicted in FIG. 6B, for example. Notably, in the former case, the second server has the capability to be configured for operation as a member of a cluster with the first server, but such configuration has not been made. In the latter case, however, the second server does not have the capability to be so configured. The server request is a request by the first server for data stored on the second server.

Process 700 continues, in step 706, with receiving by the first server the data from the second server, and in step 708 with sending from the first server the data to the client. As such, process 700 depicts a complete data operation that can be performed in, for example, either clustered storage system 602a or clustered storage system 602b.

Figure 8A:
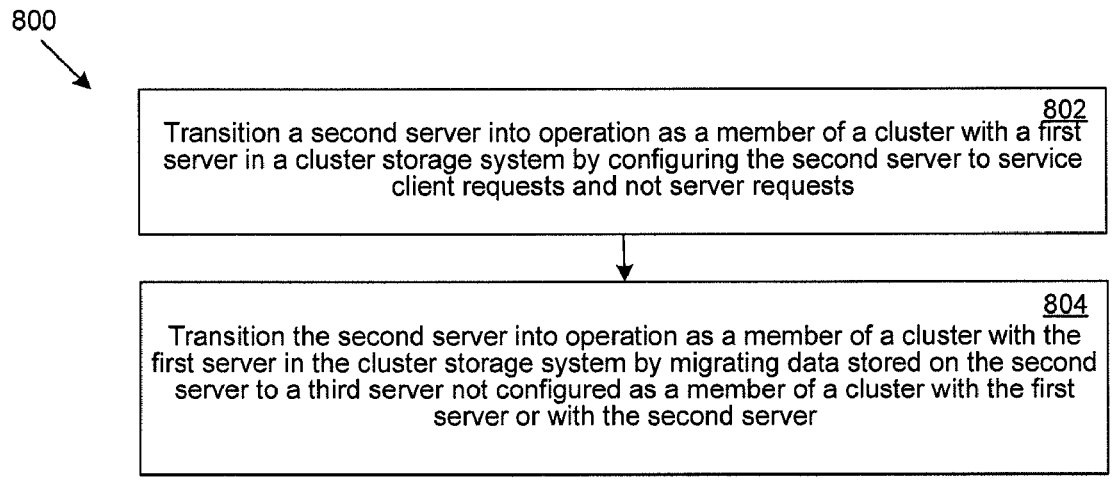
FIGS. 8A, 8B, 9A, and 9B depict flowcharts illustrating processes for transitioning a server into and out of cluster operation, respectively, and also for operating the transitioned server, according to the techniques introduced here.
Figure 8B:
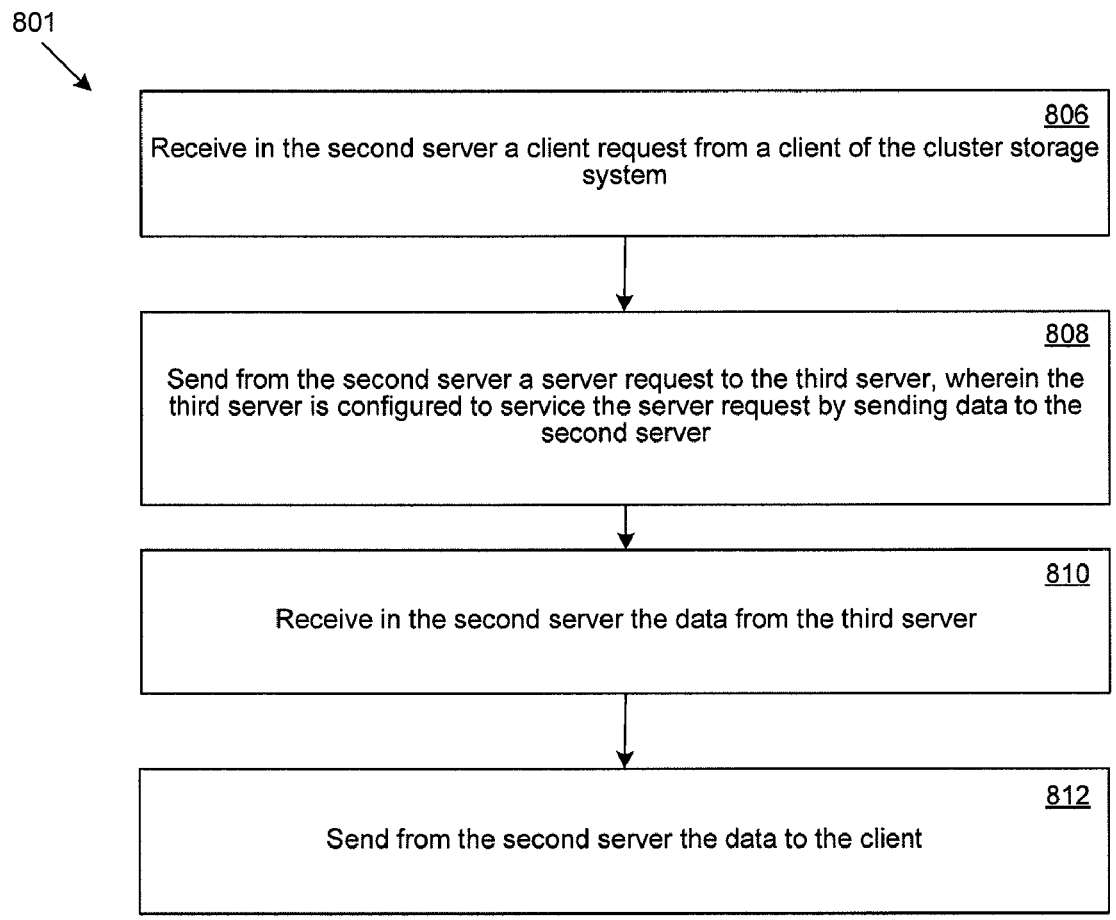

FIGS. 8A and 8B show flowcharts of process 800 and process 801, respectively, for transitioning a server into cluster operation according to the technique introduced here, and for then operating the server after the transitioning. Process 800 includes, in step 802, transitioning a second server into operation as a member of a cluster with a first server in a cluster storage system by configuring the second server to service client requests and not server requests (e.g., as described above with respect to FIGS. 4 and 5, by halting the execution of a D-module 416 on the second server and beginning the execution of an N-module 414, M-host 418, and RDB 420 on the second server). The configuration can be initiated by a human decision, for example, or by detection that the first server has exceeded a transition threshold or otherwise met or exceeded a particular workload. The first server can be, as discussed above in relation to process 700, node 608.1a depicted in FIG. 6A, or node 608.1b depicted in FIG. 6B. The second server can be, for example, node 608.7a depicted in FIG. 6A, or node 608.3b depicted in FIG. 6B. Notably, however, the second server cannot be any one of nodes 608.5b through 608.8b, as these are not configurable for cluster operation, i.e., are not cluster-compliant.

Process 800 continues, in step 804, with transitioning the second server into operation as a member of a cluster with the first server in the cluster storage system by migrating data stored on the second server to a third server not configured as a member of a cluster with the first server or with the second server. The migrating can be initiated by a human decision, for example, or by detection that the first server has exceeded a transition threshold or otherwise met or exceeded a particular workload. The third server can be, for example, node 608.8a depicted in FIG. 6A, or node 608.8b depicted in FIG. 6B. The result of the transitioning described in step 802 and step 804 is depicted in FIG. 6C, which shows clustered nodes 603a expanding to include node 608.7a (e.g., expanding to include the second server).

Process 801 begins, in step 806, with receiving by the second server a client request from a client of the cluster storage system. The client request can be a request to access data stored in the single system image of stored data in the cluster storage system. The client of process 801 corresponds, in one embodiment, to the client of process 700. Step 808, step 810, and step 812 correspond substantially to step 704, step 706, and step 708 in process 700. This correspondence illustrates that after transitioning in step 802 and step 804 in process 800, the second server of process 801 is configured to operate in a manner corresponding to the first server of process 700.

Figure 9A:
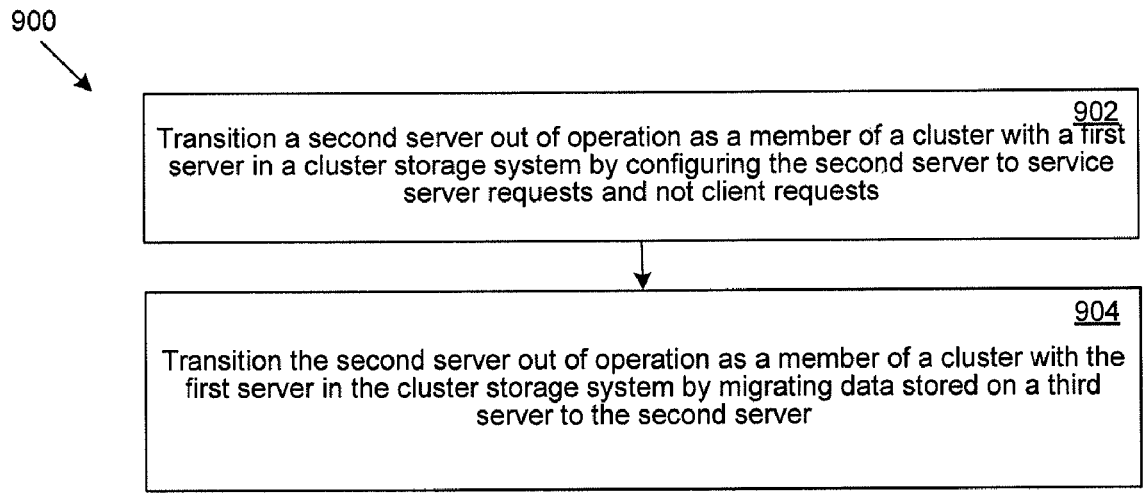
Figure 9B:
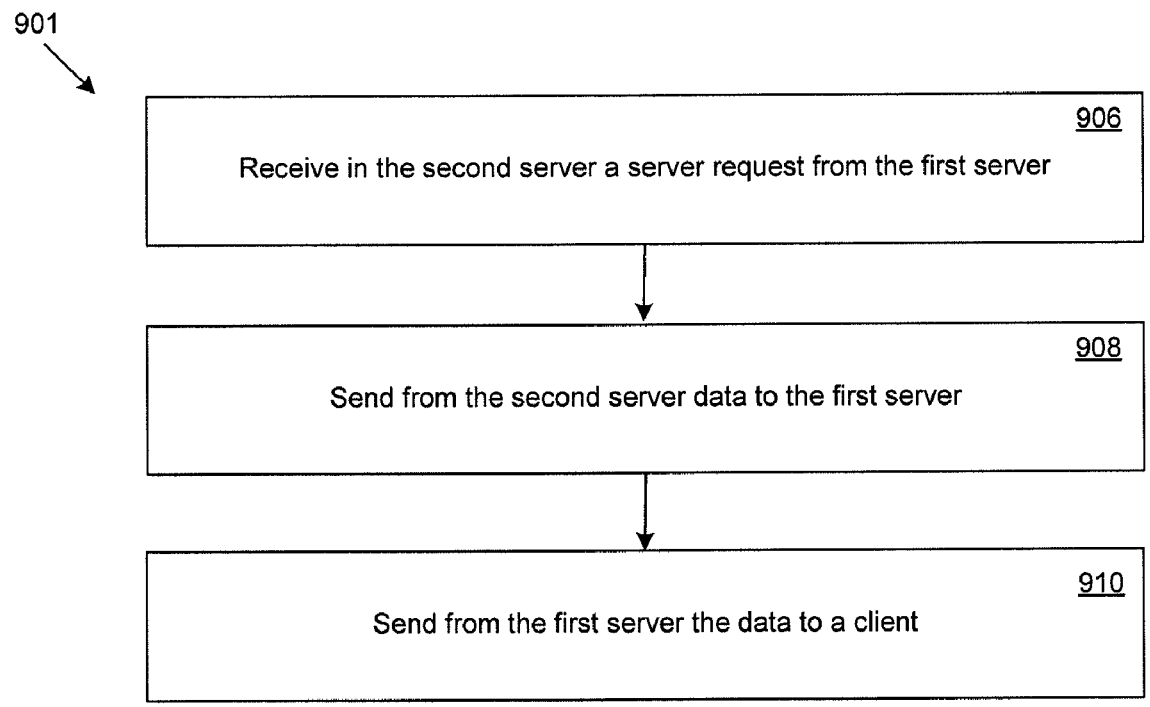

FIGS. 9A and 9B show flowcharts of process 900 and process 901, respectively, for transitioning a server out of cluster operation according to the present technique, and for then operating the server after the transitioning. Process 900 includes, in step 902, transitioning a second server out of operation as a member of a cluster with a first server in a cluster storage system by configuring the second server to service server requests and not client requests (e.g., as described above with respect to FIGS. 4 and 5, by halting the execution of an N-module 414, M-host 418, and RDB 420 on the second server and beginning the execution of a D-module 416 on the second server). The configuration can be initiated by a human decision, for example, or by detection that the first server no longer exceeds a transition threshold or otherwise fails to met or exceed a particular workload. As was the case in process 800, the first server can be node 608.1a depicted in FIG. 6A, or node 608.1b depicted in FIG. 6B. The second server can be, for example, node 608.7a depicted in FIG. 6A, or node 608.3b depicted in FIG. 6B.

Process 900 continues, in step 904, with transitioning the second server out of operation as a member of a cluster with the first server in the cluster storage system by migrating data stored on a third server to the second server. The migrating can be initiated by a human decision, for example, or by detection that the first server no longer exceeds a transition threshold or otherwise fails to met or exceed a particular workload. The third server can be, for example, node 608.8a depicted in FIG. 6A, or node 608.8b depicted in FIG. 6B. The result of the transitioning described in step 902 and 904 is depicted in FIG. 6D, which shows clustered nodes 603b contracting to exclude node 608.3b (e.g., contracting to exclude the second server).

Process 901 begins, in step 906, with receiving by the second server a server request from the first server, and then continues in step 908 and step 910 with sending from the second server data to the first server, and sending from the first server the data to the client, which corresponds, in one embodiment, to the client of process 700 or process 801.

The techniques introduced above can be implemented by programmable circuitry programmed or configured by software and/or firmware, or entirely by special-purpose (hardwired) circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium" includes any mechanism that can store information in a form accessible by a machine (a machine may be, for example, a computer, network device, cellular phone, personal digital assistant (PDA), manufacturing tool, any device with one or more processors, etc.). For example, a machine-readable medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present invention has been described with reference to specific illustrative embodiments, it will be recognized that the invention is not limited to the embodiments described, but can be practiced with modification and alteration within the spirit and scope of the claims. Accordingly, the specification and drawings are to be regarded in an illustrative sense rather than a restrictive sense.

What is claimed is:

1. A scalable heterogeneous cluster storage system comprising:
    a first storage server configured for operation as a member of a cluster with a second storage server, wherein the first storage server and the second storage server each has a management gateway module for maintaining quorum within the cluster, wherein the management gateway module of the second storage server is disabled when the second storage server is configured for operation outside of any storage cluster, and wherein the first storage server is further configured to service a client request from a client of the cluster storage system by sending a server request based on the client request; and
    a third storage server configured to receive the server request, wherein the third storage server is not configured for operation as a member of a cluster with the first storage server and the second storage server, wherein the third storage server is not in quorum to ensure that a single system image of stored data in the storage system is consistent across all servers, and wherein the third storage server is configured to service the server request from the first storage server by retrieving data stored in the third storage server, and not stored in the first server, and sending the data to the first storage server;
    wherein the second storage server is selectably configured for operation either as a member of a cluster with the first storage server or not as a member of a cluster with the first storage server and wherein the second storage server is homogeneous with respect to the first storage server; and
    wherein the second storage server is further configured to transition from servicing server requests while not configured as a member of a cluster with the first storage server, to servicing client requests while configured as a member of a cluster with the first storage server.

2. The cluster storage system of claim 1, wherein the second storage server is further configured to transition upon a determination that the first storage server has exceeded a transition workload.

3. The cluster storage system of claim 1, wherein the second storage server is further configured to transition by migrating data stored on the second storage server to the third storage server not configured as a member of a cluster with the first storage server and by beginning the execution of cluster management software, and wherein the third storage server is heterogeneous with respect to the first storage server and the second storage server.

4. The cluster storage system of claim 1, wherein the third storage server is further configured to service a server request from the second storage server while the second storage server is configured as a member of a cluster with the first storage server, and wherein the third storage server is heterogeneous with respect to the first storage server and the second storage server.

5. The cluster storage system of claim 1, wherein the first and second storage servers are configured to operate in quorum to ensure that a single system image of stored data in the storage system is consistent across all servers while both are operating as members of a cluster with each other.

6. A cluster storage system comprising:
    a first storage server configured to service a client request from a client of the cluster storage system by utilizing the client request to send a server request, and further configured to have a cluster management capability; and
    a second storage server configured to receive the server request from the first storage server, wherein the second storage server is not configured for operation as a member of a cluster with the first storage server, wherein the second storage server has a management gateway module for maintaining quorum with the cluster, the management gateway module enabled when the second storage server is configured for operation as a member of any storage cluster and disabled when the second storage server is configured for operation outside of any storage cluster, wherein the second storage server is not in quorum to ensure that a single system image of stored data in the storage system is consistent across all servers, and wherein the second storage server is configured to service the server request from the first storage server by retrieving data stored in the second storage server and sending the data to the first storage server;
    wherein the second storage server is selectably configured for operation either as a member of a cluster with the first storage server or not as a member of a cluster with the first storage server and wherein the second storage server is homogeneous with respect to the first storage server; and
    wherein the second storage server is further configured to transition from servicing server requests while not configured as a member of a cluster with the first storage server, to servicing client requests while configured as a member of a cluster with the first storage server.

7. The cluster storage system of claim 6, wherein the second storage server is configured to transition into operation as a member of a cluster with the first storage server, so that the first storage server and the second storage server each have the cluster management capability, wherein the first storage server and the second storage server are homogeneous with respect to each other.

8. The cluster storage system of claim 7, wherein the second storage server is further configured to transition from servicing server requests while not configured as a member of a cluster with the first storage server, to servicing client requests while configured as a member of a cluster with the first storage server.

9. The cluster storage system of claim 7, wherein the second storage server is further configured to transition by migrating data stored on the second storage server to a third storage server not configured as a member of a cluster with the first storage server and by beginning the execution of cluster management software.

10. The cluster storage system of claim 7, wherein the second storage server is not configured to service client requests while not configured as a member of a cluster with the first storage server.

11. The cluster storage system of claim 7, wherein the first storage server and the second storage server are configured to operate in quorum while both are operating as members of a cluster with each other, and wherein the second storage server is not required to maintain quorum while not operating as members of a cluster with each other.

12. The cluster storage system of claim 6, wherein the second storage server is not configurable for operation as a member of a cluster with the first storage server, wherein the first storage server and the second storage server are heterogeneous with respect to each other.

13. The cluster storage system of claim 12, further comprising a third storage server that is not configured for operation as a member of a cluster with the first storage server and the second storage server, wherein the third storage server is configured to service a server request from the first storage server by retrieving data stored in the third storage server and sending the data to the first storage server.

14. The cluster storage system of claim 13, wherein the third storage server is configured to transition into operation as a member of a cluster with the first storage server, wherein the first storage server and the third storage server are homogeneous with respect to each other, by migrating data stored on the third storage server to the second storage server not configured as a member of a cluster with the first storage server and by beginning the execution of cluster management software.

15. The cluster storage system of claim 13, wherein the third storage server is further configured to transition from servicing server requests while not configured as a member of a cluster with the first storage server, to servicing client requests while configured as a member of a cluster with the first storage server.

16. The cluster storage system of claim 13, wherein the third storage server is not configured to service client requests while not configured as a member of a cluster with the first storage server.

17. The cluster storage system of claim 13, wherein the first storage server and the third storage server are configured to operate in quorum while both are operating as members of a cluster with each other, and wherein the second storage server is not required to maintain quorum.

18. The cluster storage system of claim 13, wherein the second storage server is configured to service server requests from the first storage server and the third storage server while the third storage server is configured as a member of a cluster with the first storage server.

19. A method comprising:
receiving, in a first storage server of a cluster storage system, a client request from a client of the cluster storage system;

sending, from the first storage server, a server request to a second storage server of the cluster storage system, wherein the second storage server is not configured for operation as a member of a cluster with the first storage server, wherein the second storage server has a management gateway module for maintaining quorum with a storage cluster, the management gateway module enabled when the second storage server is configured for operation as a member of any storage cluster and disabled when the second storage server is configured for operation outside of any storage cluster, wherein the second storage server is not in quorum to ensure that a single system image of stored data in the storage system is consistent across all servers, and wherein the second storage server is configured to service the server request from the first storage server by retrieving data stored in the second storage server and sending the data to the first storage server;

receiving, in the first storage server, the data from the second storage server; and sending, from the first storage server, the data to the client of the cluster storage system;

wherein the second storage server is selectably configured for operation either as a member of a cluster with the first storage server or not as a member of a cluster with the first storage server and wherein the second storage server is homogeneous with respect to the first storage server; and wherein the second storage server is further configured to transition from servicing server requests while not configured as a member of a cluster with the first storage server, to servicing client requests while configured as a member of a cluster with the first storage server.

20. The method of claim 19, further comprising transitioning the second storage server into operation as a member of a cluster with the first storage server.

21. The method of claim 20, wherein the transitioning the second storage server includes configuring the second storage server to service client requests and not server requests.

22. The method of claim 20, wherein the transitioning the second storage server further includes migrating data stored on the second storage server to a third storage server not configured as a member of a cluster with the first storage server and the second storage server and by beginning the execution on the second storage server of cluster management software.

23. The method of claim 20, wherein the transitioning occurs based on a determination that the first storage server has exceeded a transition workload based on one or more of an incoming client data traffic, a total amount of storage being handled by the first storage server, a processor usage, an amount of memory usage, an I/O activity, or a storage device activity.

24. The method of claim 20, wherein the transitioning the second storage server is a linear time complexity operation that exhibits increasing time requirements as a number of the servers increases.

25. The method of claim 20, further comprising adding a third storage server to the cluster storage system, wherein the third storage server is not configured for operation as a member of a cluster with the first storage server, and wherein the adding the third storage server is a constant time complexity operation.

26. The method of claim 19, further comprising:
receiving, in the first storage server, a client instruction from the client of the cluster storage system;

sending, from the first storage server, a server instruction to the second storage server, wherein the second storage server is configured to service the server instruction from the first storage server by storing data in the server instruction in the second storage server and sending a confirmation to the first storage server; and receiving, in the first storage server, the confirmation from the second storage server.

27. A method comprising:

receiving, in a first storage server of a cluster storage system, a client request from a client of the cluster storage system;

sending, from the first storage server, a server request to a second storage server of the cluster storage system, wherein the second storage server is not configured for operation as a member of a cluster with the first storage server, wherein the second storage server has a management gateway module for maintaining quorum with a storage cluster, the management gateway module enabled when the second storage server is configured for operation as a member of any storage cluster and disabled when the second storage server is configured for operation outside of any storage cluster, wherein the second storage server is not in quorum to ensure that a single system image of stored data in the storage system is consistent across all servers, and wherein the second storage server is configured to service the server request from the first storage server by retrieving data stored in the second storage server and sending the data to the first storage server;

receiving, in the first storage server, the data from the second storage server;

sending, from the first storage server, the data to the client of the cluster storage system; and transitioning the second storage server into operation as a member of a cluster with the first storage server by migrating data stored on the second storage server to a third storage server not configured as a member of a cluster with the first storage server and the second storage server and by beginning the execution on the second storage server of cluster management software;

wherein the second storage server is selectably configured for operation either as a member of a cluster with the first storage server or not as a member of a cluster with the first storage server and wherein the second storage server is homogeneous with respect to the first storage server; and wherein the second storage server is further configured to transition from servicing server requests while not configured as a member of a cluster with the first storage server, to servicing client requests while configured as a member of a cluster with the first storage server.

28. The method of claim 27, wherein the transitioning the second storage server is a linear time complexity operation that exhibits increasing time requirements as a number of the servers increases.

29. The method of claim 27, further comprising adding the third storage server to the cluster storage system, wherein the third storage server is not configured for operation as a member of a cluster with the first storage server, and wherein the adding the third storage server is a constant time complexity operation.

30. A method comprising:

determining that a first storage server of a cluster storage system is servicing client requests exceeding a transition threshold, wherein servicing client requests includes sending, from the first storage server, server requests to a second storage server and a third storage server of the cluster storage system, wherein the second storage server has a management gateway daemon for maintaining quorum with a storage cluster, the management gateway daemon enabled when the second storage server is configured for operation as a member of any storage cluster and disabled when the second storage server is configured for operation outside of a storage cluster, wherein the second storage server and the third storage server are not configured for operation as members of a cluster with the first storage server, and wherein the second storage server and the third storage server are configured to service the server requests from the first storage server by retrieving data stored in the second storage server or the third storage server and sending the data to the first storage server; and transitioning, responsive to the determining, the second storage server into operation as a member of a cluster with the first storage server, wherein the first storage server and the second storage server service client requests by sending server requests to the third storage server of the cluster storage system;

wherein the second storage server is selectably configured for operation either as a member of a cluster with the first storage server or not as a member of a cluster with the first storage server and wherein the second storage server is homogeneous with respect to the first storage server; and wherein the second storage server is further configured to transition from servicing server requests while not configured as a member of a cluster with the first storage server, to servicing client requests while configured as a member of a cluster with the first storage server.

31. The method of claim 20, wherein the transitioning the second storage server includes configuring the second storage server to service client requests and not server requests.

32. The method of claim 20, wherein the transitioning the second storage server further includes migrating data stored on the second storage server to the third storage server not configured as a member of a cluster with the first storage server and the second storage server, and includes beginning the execution on the second storage server of cluster management software.

* * * * *